(12) United States Patent
Roberts

(10) Patent No.: US 7,780,713 B2
(45) Date of Patent: Aug. 24, 2010

(54) HEAT ABSORBING PACK

(76) Inventor: John B. Roberts, 35995 Fremont Blvd., Apt. 7, Fremont, CA (US) 94536

( * ) Notice: Subject to any disclaimer, the term of this patent is extended or adjusted under 35 U.S.C. 154(b) by 1164 days.

(21) Appl. No.: 11/325,100

(22) Filed: Jan. 4, 2006

(65) Prior Publication Data
US 2007/0151261 A1 Jul. 5, 2007

(51) Int. Cl.
A61F 7/02 (2006.01)

(52) U.S. Cl. ........... 607/108; 607/109; 607/110; 607/111; 126/204; 126/263.01; 165/104.12; 165/104.17; 252/70

(58) Field of Classification Search ........... 62/259.3; 126/204, FOR. 110, 263.01; 165/104.12, 165/104.17; 252/70; 607/96
See application file for complete search history.

(56) References Cited

U.S. PATENT DOCUMENTS

| | | | | |
|---|---|---|---|---|
| 1,831,747 A | * | 11/1931 | Meyers | 66/173 |
| 2,130,636 A | * | 9/1938 | Clutsom | 139/431 |
| 2,144,912 A | * | 1/1939 | Clutsom | 139/383 R |
| 2,214,021 A | * | 9/1940 | Hill | 66/25 |
| 3,539,440 A | * | 11/1970 | Gerek et al. | 428/354 |
| 3,950,789 A | * | 4/1976 | Konz et al. | 2/93 |
| 4,287,076 A | * | 9/1981 | Babin et al. | 252/70 |
| 4,349,446 A | * | 9/1982 | Marks | 252/70 |
| 4,433,025 A | * | 2/1984 | Pusch et al. | 428/207 |
| 4,508,632 A | * | 4/1985 | Takeda et al. | 252/70 |
| 4,689,164 A | * | 8/1987 | Ames | 252/70 |
| 4,856,294 A | * | 8/1989 | Scaringe et al. | 62/259.3 |
| 5,106,520 A | * | 4/1992 | Salyer | 252/70 |
| 5,111,668 A | * | 5/1992 | Parrish et al. | 62/259.3 |
| 5,113,666 A | * | 5/1992 | Parrish et al. | 62/259.3 |
| 5,211,949 A | * | 5/1993 | Salyer | 424/402 |
| 5,254,380 A | * | 10/1993 | Salyer | 428/35.7 |
| 5,289,695 A | * | 3/1994 | Parrish et al. | 62/259.3 |
| 5,415,222 A | * | 5/1995 | Colvin et al. | 165/46 |
| 5,423,996 A | * | 6/1995 | Salyer | 252/70 |
| 5,453,213 A | * | 9/1995 | Kakiuchi et al. | 252/70 |
| 5,528,910 A | * | 6/1996 | Azais | 66/197 |
| 5,552,075 A | * | 9/1996 | Salyer | 252/70 |
| 5,567,346 A | * | 10/1996 | Kakiuchi et al. | 252/70 |
| 5,650,090 A | * | 7/1997 | Salyer | 252/70 |
| 5,741,392 A | * | 4/1998 | Droz | 156/295 |
| 5,863,236 A | * | 1/1999 | Johnson | 450/62 |
| 5,875,835 A | * | 3/1999 | Shramo et al. | 165/96 |
| 5,935,157 A | * | 8/1999 | Harmon | 607/111 |
| 6,004,662 A | * | 12/1999 | Buckley | 428/304.4 |
| 6,083,256 A | * | 7/2000 | Der Ovanesian | 607/114 |
| 6,120,530 A | * | 9/2000 | Nuckols et al. | 607/108 |
| 6,125,645 A | * | 10/2000 | Horn | 62/259.3 |
| 6,132,455 A | | 10/2000 | Shang | |
| 6,185,742 B1 | * | 2/2001 | Doherty | 2/81 |
| 6,233,845 B1 | * | 5/2001 | Belli | 36/3 A |
| 6,257,011 B1 | * | 7/2001 | Siman-Tov et al. | 62/259.3 |
| 6,298,907 B1 | * | 10/2001 | Colvin et al. | 165/46 |
| 6,539,567 B1 | * | 4/2003 | Bae | 5/638 |
| 6,645,598 B2 | * | 11/2003 | Alderman | 428/69 |

(Continued)

Primary Examiner—Kenneth B Rinehart
Assistant Examiner—Jorge Pereiro
(74) Attorney, Agent, or Firm—David Lewis; Edmund H. Kwong

(57) ABSTRACT

A pouch includes a mixture of a crystalline substance and liquid that is solid at room temperature (e.g., 70° F.) and melts when in contact with a human body, therein cooling the body.

28 Claims, 18 Drawing Sheets

U.S. PATENT DOCUMENTS

| | | | |
|---|---|---|---|
| 6,679,912 B2 * | 1/2004 | Stelter | 623/7 |
| 6,755,852 B2 * | 6/2004 | Lachenbruch et al. | 607/114 |
| 6,855,410 B2 * | 2/2005 | Buckley | 428/311.11 |
| 6,981,341 B2 * | 1/2006 | Baychar | 36/24.5 |
| 2002/0164473 A1 * | 11/2002 | Buckley | 428/308.4 |
| 2003/0024620 A1 * | 2/2003 | Haberkorn | 150/154 |
| 2003/0195448 A1 * | 10/2003 | Jensen | 602/41 |
| 2006/0024486 A1 * | 2/2006 | Pause | 428/310.5 |
| 2006/0064147 A1 * | 3/2006 | Almqvist | 607/108 |
| 2007/0148862 A1 * | 6/2007 | Chen et al. | 438/257 |
| 2008/0168595 A1 * | 7/2008 | Almqvist | 2/458 |

* cited by examiner

FIG. 5
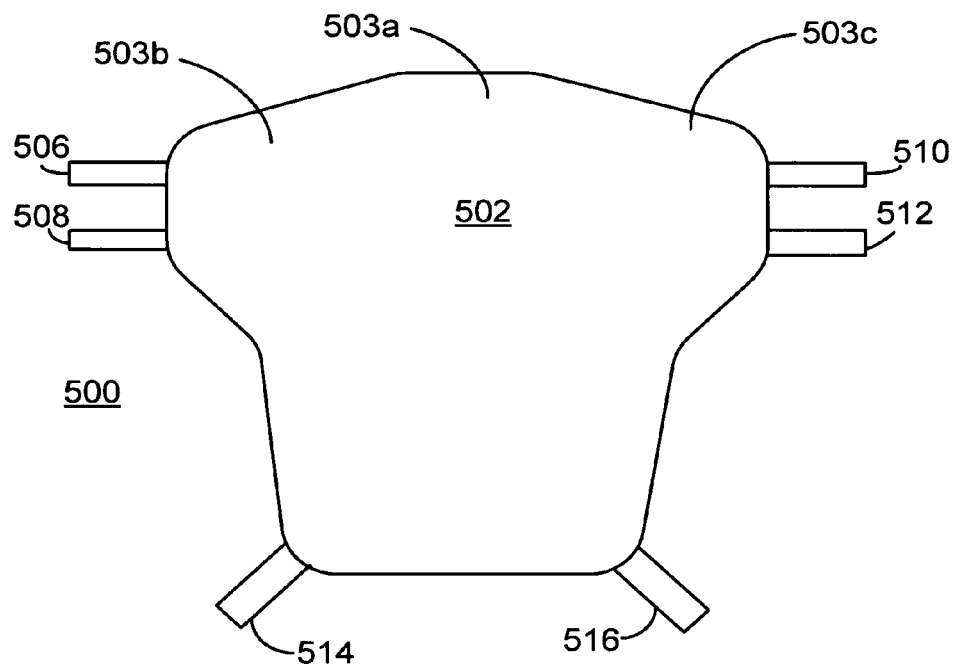
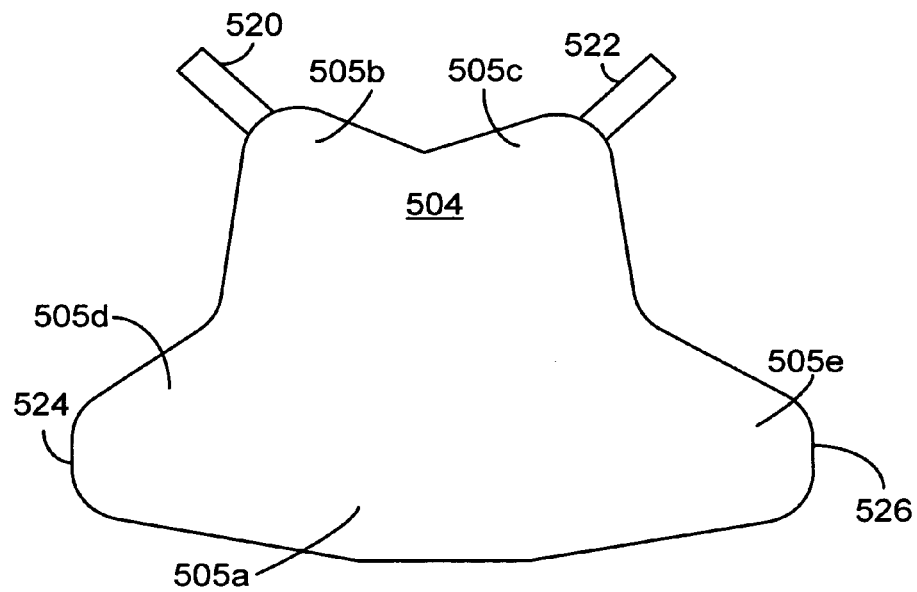

1900

| 1902 | 1904 | 1906 | 1908 | 1910 | 1912 |
|------|------|------|------|------|------|
| 1914 | 1916 | 1918 | 1920 | 1922 | 1924 |

FIG. 19A

HEAT ABSORBING PACK

FIELD

The subject matter in this specification is related to the field of cooling devices.

BACKGROUND OF THE DISCLOSURE

The subject matter discussed in the background section should not be assumed to be prior art merely as a result of its mention in the background section. Similarly, a problem mentioned in the background section or associated with the subject matter of the background section should not be assumed to have been previously recognized in the prior art. The subjection matter in the background section merely represents different approaches, which in and of themselves may also be inventions.

There are a variety of situations in which it may be desirable to wear an item that helps keep a person cool.

BRIEF DESCRIPTION OF THE FIGURES

In the following drawings like reference numbers are used to refer to like elements. Although the following figures depict various examples of the invention, the invention is not limited to the examples depicted in the figures.

FIG. 5 shows a vest, which includes two packs that are each embodiments of the pack of FIG. 1.

FIG. 19A shows a sheet that is an embodiment of the pack of FIG. 1.

DETAILED DESCRIPTION OF SOME EXAMPLES OF SOME EMBODIMENTS OF THE INVENTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-19B is a brief description of each element, which may have no more than the name of each of the elements in the one of FIGS. 1-19B that is being discussed. After the brief description of each element, each element is further discussed in numerical order. Further, in general, each of FIGS. 1-21 is discussed in numerical order and the elements within FIGS. 1-21 are also usually discussed in numerical order to facilitate easily locating the discussion of a particular element. Nonetheless, there is no one location where all of the information of any element of FIGS. 1-21 is necessarily located. Unique information about any particular element or any other aspect of any of FIGS. 1-21 may be found in, or implied by, any part of the specification.

Figure 1:
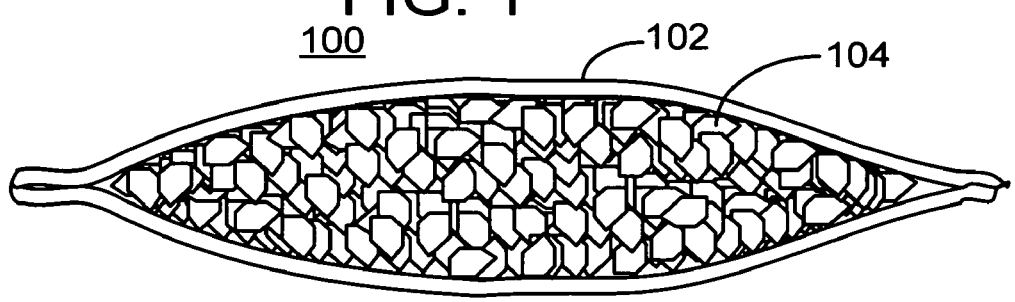
FIG. 1 shows a pack in a first state, which is used for cooling a warm item.

FIG. 1 shows a pack 100 in a first state, which is used for cooling a warm item. Pack 100 includes material 102 and crystals 104 (which are solid). In other embodiments, pack 100 may not have all of the parts listed and/or may have other parts instead of or in addition to those listed.

Material 102 forms a pouch for holding crystals and liquid and maintaining a closed loop system for the conversion of crystals to liquid and liquid to crystals. The conversion of the liquid to crystals may be referred to as regeneration, which will be discussed further in conjunction with crystals 104, FIG. 2, and FIG. 3A. Material 102 may be inert to its contents, and may be form a hermetically sealed pouch that does not leak liquids or allow contaminants to enter. Since once sealed material 102 does not allow contaminants to enter or its contents to leave, the contents of material 102 form the closed loop system. In an embodiment, material 102 may include multiple layers. In an embodiment, material 102 has an outer layer and an inner layer. In an embodiment, material 102 or the inner layer of material 102 has an inner coating that prevents leaks. Material 102 may include an outer layer of cotton and/or satin for the comfort of an individual using pack 100. An embodiment in which material 102 includes multiple layers is further discussed in conjunction with FIGS. 3A and 3B. In another embodiment, material 102 may be made from any of a variety of materials (such as various plastics) in a single layer or may have any number of layers as long as material 102 does not leak (or does not leak significantly and therefore does not have a significant negative affect on the regeneration), does not allow contaminants to enter (or does not allow enough contaminants to enter so as to have a negative affect on the regeneration) and as long as material 102 allows heat to be absorbed on at least one side of pack 100, which may be referred to as the heat-absorbing-side.

Crystals 104 may absorb heat during a liquefying (e.g., melting) process while maintaining an essentially constant temperature while liquefying (e.g., the temperature is close enough to constant so that a user is unlikely to notice the difference). In this specification, the process of melting is generic to a process by which a solid changes to a liquid at a constant temperature. Although the solid may be a solid compound that has a liquid compound absorbed therein (e.g., salt having water absorbed therein), although the liquid may be the liquid compound that has the solid compound dissolved therein, and although the process of forming the liquid may involve the liquid compound that is absorbed by the solid compound dissolving part of the solid compound within which it was absorbed therein forming the solution of the liquid compound and the compound solid, the term melting will still be used for the conversion of a solid to a liquid at a constant temperature. Additionally, the term melting temperature is generic to the lowest temperature at which this process occurs.

Crystals 104 are one phase of a heat absorbing material. Crystals 104 may be at least as small as coarse salt. For example, crystals 104 may be less than 2 mm in diameter, less than 1 mm in diameter, less than 0.5 mm, or less than 0.1 mm in diameter. Sometimes two or more crystals 104 join together and become a larger solid crystal. Crystals 104 may include one or more salts, such as sodium sulfate. Crystals 104 may have a liquid such as water absorbed within. In an embodiment, crystals 104 contain substantially only water and sodium sulfate (e.g., water, sodium sulfate, and possibly some unintended impurities as is often found in tap water). For example crystals 104 may include $Na_2SO_4.H_2O$ having a melting point of 78.6° F. (or of substantially 78.6° F., e.g., within 5% of 78.6° F.) or lower. Other sulfate compounds have similar characteristics, but $Na_2SO_4$ tends to regenerate quicker and/or tends to be cheaper than other sulfate compounds. By combining two types of sulfates and water it is possible to create a heat absorbing mixture that will cool at approximately 4° F. cooler (e.g., within 10% of 4 degrees cooler) than a mixture of $Na_2SO_4$ and water, but the regeneration process is slower than $Na_2SO_4$ and water and sometimes does not occur. In an embodiment, the heat absorbing mixture (e.g., crystals 104) is not toxic. In an embodiment the heat absorbing mixture is edible. Each pack 100 may be divided into any number of divisions, in which each division is a separate pocket holding crystals 104. The separate divisions are discussed further in connection with FIGS. 19 and 21.

Figure 2:
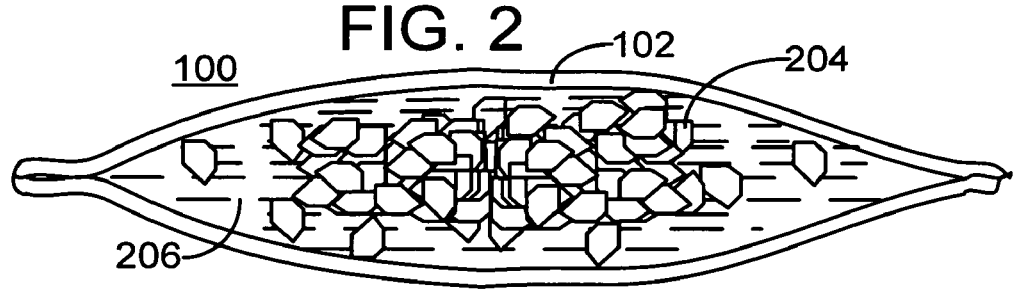
FIG. 2 shows an embodiment of the pack of FIG. 1 in a second state.

FIG. 2 shows a pack 100 in a second state. Pack 100 includes material 102 and solid crystals 204, and liquid 206. In other embodiments, pack 100 may not have all of the parts listed and/or may have other parts instead of or in addition to those listed.

Material 102 was discussed above in conjunction with FIG. 1, above. The combination of crystals 204 and liquid 206 are one phase of the heat absorbing mixture and crystals 104 are another phase of the heat absorbing mixture. Crystals 204 may have a slightly different mixture of compounds than crystals 104. For example, if crystals 104 were $Na_2SO_4.H_2O$, crystals 204 may be $Na_2SO_4$ with less water than $Na_2SO_4.H_2O$. Liquid 206 is a liquid that forms when crystals 104 are heated. For example, liquid 206 may be a saturated solution of water and sodium sulfate salt. After pack 100 is placed in contact with a warm object, crystals 104 melt by at least in part dissolving within the liquid (e.g., water) absorbed within crystals 104. Although crystals 104 are a specific embodiment of a heat absorbing mixture, any reference to crystals 104 or the mixture of crystals 204 and liquid 206 may be replaced with any heating absorbing material having the appropriate properties for the application being discussed. Similarly, any place a heat absorbing material is mentioned, crystals 104 or the mixture of crystals 204 and liquid 206 may be substituted to get a specific embodiment.

At least some of liquid 206 remains within crystals 204 at least until an amount of heat equal to the latent heat of fusion for the heat absorbing mixture that makes up crystals 104 is absorbed. If crystals 104 are $Na_2SO_4.H_2O$ and the latent heat of fusion has been absorbed, the resulting mixture is 30%±5% (e.g., 25% to 35%) by weight of water saturated with sodium sulfate and 70%±5% (e.g., 65% to 75%) by weight of sodium sulfate. In an embodiment the ratio of sodium sulfate to water by weight is 3 to 1. Until the heat of fusion is absorbed, the heat absorbing mixture (e.g., the mixture of liquid 206 and crystal 204) remains at a substantially constant temperature (e.g., close enough to a constant temperature that most users would not notice any fluctuation), which in the $Na_2SO_4.H_2O$ embodiment is 78.6° F. Afterwards, although the mixture continues to absorb heat, the temperature rises as the heat is absorbed until the temperature of the pack and of the subject being cooled are substantially the same (the exact temperature that the pack rises to is determined by entire system including at least everything that the pack is in contact with), and consequently, the cooling effect is not as significant after the latent heat of fusion has been absorbed.

In an embodiment, soon after pack 100 is removed from the subject being cooled, liquid 206 begins to crystallize and thereby regenerate itself. The remaining crystals 204 that did not melt or otherwise liquefy form nucleation sites for the crystals dissolved in liquid 206. In an embodiment, after the latent heat of fusion has been absorbed, there is still a significant amount of crystals 204 that are solid and form nucleation sites for the re-crystallization of liquid 206 (which is also referred to as regeneration). For example, the amount of crystals 204 may be 65% by weight or greater of the combination of crystals 204 and liquid 206. Alternatively, the amount of crystals 204 may be 70% by weight or greater of the combination of crystals 204 and liquid 206. Since, there is a relatively large amount of crystals 204, there are a large number of nucleation sites, which facilitates quick regeneration of crystals 104.

For example, if crystals 104 are $Na_2SO_4.H_2O$, if the subject being cooled has a temperature of substantially 98.6° F. (the temperature of a normal human being) and if the ambient temperature is substantially 70° F. (e.g., within 5% of 70° F.), then pack 100 will maintain a substantially constant temperature (e.g., 78.6° F.) for an hour for each pound of solid $Na_2SO_4.H_2O$ in pack 100 at the start of the cooling. Afterwards, if pack 100 is removed from the subject that was being cooled and placed in an environment having a temperature of substantially 70° F., pack 100 will fully regenerate in about 45 minutes for each pound of $Na_2SO_4.H_2O$ (e.g., within 5% or within 10% or within 5-10% of 45 minutes). As long as there are at least some crystals 204 that have not melted, the heat absorbing material will regenerate at a rate that is comparable (e.g., less than) to the time for absorbing the latent heat of fusion or to melt those of crystals 104 and/or 204 that have melted. In order to help maintain the relatively short times necessary for regeneration, material 102 is sealed forming a pouch containing crystals 104 or the combination of crystals 204 and liquid 206 (the heat absorbing mixture). The seal maintains the ratio of sodium sulfate to water at the same ration or at substantially the same ratio (e.g., close enough to the same ratio so that regeneration occurs) as at the time when pack 100 was created, by preventing the heat absorbing mixture from escaping and by preventing contaminants from entering pack 100. One or more packs 100 may be placed in the lining of hats or other clothing and/or may be used to make any article of clothing. Examples of some specific embodiments are discussed in conjunction with FIGS. 4-19B.

Figure 3A:
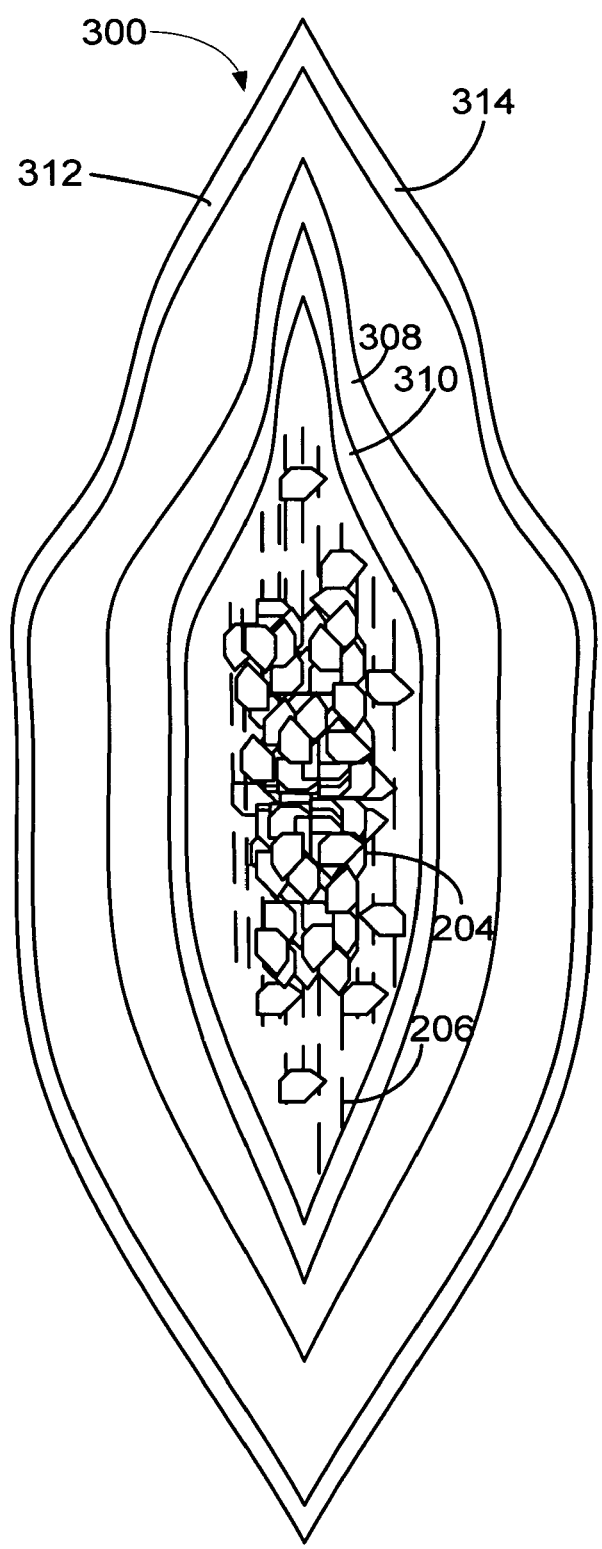
FIG. 3A shows an embodiment of the pack of FIG. 1 including at least some optional details not shown in FIG. 1.

FIG. 3A shows pack 300. Pack 300 may include crystals 204 and liquid 206, inner layer 308, protective layer 310, outer layer 312, and outer layer 314. In other embodiments, pack 300 may not have all of the parts listed and/or may have other parts instead of or in addition to those listed.

Crystals 204 and liquid 206 were discussed above in conjunction with FIG. 2, above. Pack 300 may be an embodiment of pack 100. The combination of inner layer 308, protective layer 310, outer layer 312, and/or outer layer 314 may be an embodiment of material 102. For example, the combination of inner layer 308 and protective layer 310 may be an embodiment of material 102. Inner layer 308 may be made from any of a variety of materials, such as nylon, vinyl, and/or PVC. Also, any material that is water tight and air tight may be used for material 102 as long as the material conducts (or is structured to conduct) heat well enough to provide a cooling effect resulting from the heat absorbing mixture absorbing heat, such as rubbers, cloth including plastics, and cloth including metals. Protective layer 310 protects pack 300 from being punctured by crystals 204 and/or prevents or impedes liquid 206 from leaking out of pack 300. In an embodiment, protective layer 310 is inert to crystal 204 and liquid 206. Protective layer 310 may be made from any of a variety of materials. For example, protective layer 310 may be a sealant or glue, such as a Polyvinyl Chloride (PVC) adhesive. In one embodiment, glue is used for protective layer 310 that is sold under the tradename Thermobag, which can be purchased from Ningbo Formasan Rubber Group Inc., located at YaQian JingNan Exp. Pro & Trade District, Ningbo, China, having Taiwan Headquarters, Taiwan Formasan Inc., Taipei 8F, No. 82 Hankou Street, Section 1, Taipei, Taiwan. Inner layer 308 is made from a water proof material and/or a material that becomes waterproof when protective layer 310 is placed on one side. Once sealed, inner layer 308 and protective layer 310 maintain a closed loop environment for the heat absorbing mixture. The inner layer 308 and protective layer 310 should be at least thick enough so that leakages, contamination, and/or breaks are substantially prevented (at least to an extent that regeneration still occurs), and at least thin enough so that a cooling effect is expected to be discernable by a user.

Outer layer 312 is located outside of the pouch formed by inner layer 308. Outer layer 312 may be attached to inner layer 308 in one or more places. Although in the embodiment of FIG. 3A outer layer 312 is separated from inner layer 308, in another embodiment no separation exists.

Outer layer 312 may be made from any of a number of materials, such as a thin material that is expected to feel comfortable when placed in contact with the skin of a human being. In an embodiment, outer layer 312 is thin enough and/or has a heat conductivity that allows heat from the subject being cooled to be absorbed into crystals 104 and produce a cooling effect that is expected to be discernable to a user. In an embodiment, outer layer 312 is thin enough so that perspiration from the subject being cooled tends to evaporate after being absorbed by outer layer 312 and/or instead of being absorbed by outer layer 312. Alternatively, outer layer 312 is made from a material that tends not to accumulate perspiration from the subject being cooled for other reasons. In an embodiment, outer layer 312 is strong enough to resist tearing as a result of normal use. In an embodiment, outer layer 312 is strong enough to resist tearing as a result of pulling apart two pieces of interlocking material (e.g., Velcro®) attached to outer layer 312. For example, outer layer 312 may be ice cotton, which is a thin sheet of cotton and which may have an area density of 90 g/m² and may have a yarn of 40 s. In another embodiment, outer layer 312 is plush cotton, which may have an area density of 180 g/m². Ice cotton tends to accumulate less perspiration than plush cotton.

Similar to outer layer 312, outer layer 314 is located outside of the pouch formed by protective layer 310. Outer layer 314 may be attached to protective layer 310 in one or more places. Although in the embodiment of FIG. 3A outer layer 314 is separated from inner layer 308, in another embodiment no separation exists. Although in the embodiment of FIG. 3A outer layer 312 is attached to outer layer 314, in another embodiment outer layers 312 and 314 are not attached to each other, but are attached to inner layer 308 instead.

Similar to outer layer 312, outer layer 314 may be made from any of a variety of materials. In an embodiment, outer layer 314 should also be strong enough to resist tearing during normal use, and may also need to support an interlocking material. However, in contrast to outer layer 312, whether outer layer 314 is chosen to insulate and prevent heat transfer or whether outer layer 314 is chosen to conduct heat relatively well compared to other materials used in apparels, pillows, and linens, for example, may depend upon the environment in which pack 100 is intended to be used. If the environment within which pack 100 is intended to be used has a lower temperature than the melting temperature of crystals 104, or at least has a lower temperature than the subject being cooled, then outer layer 314 may be a material that allows heat transfer between pack 300 and the environment. In this embodiment, heat generated by the subject being cooled is allowed to escape via outer layer 314. Additionally, or alternatively, as crystals 204 are heated on one side by the subject being cooled, crystals 204 are also cooled on the other side (via outer layer 314) by the ambient temperature. In other embodiments, if pack 300 is intended to be used in environments in which the temperature is expected to be substantially the same as (e.g., close enough to the same such that a user is unlikely to notice the difference) or higher than that of the subject matter being cooled, outer layer 314 may be a good insulator so as to prevent crystals 204 from being heated by sources of heat other than the subject being cooled. In one embodiment, outer layer 314 is made from satin. Alternatively, outer layer 314 may be made from any of a variety of materials, such as cotton, silk satin, polyester, and/or nylon. For example, if pack 300 is intended to be worn in a desert that typically is hotter than 98.6° F. and for a period of time that is no longer than the time required to melt the heat absorbing mixture to its second state, outer layer 314 may be, in at least some situations, chosen to be a good insulator so as to keep the desert heat from entering and heating the wearer of pack 300. In an alternative embodiment, both before and after absorbing the latent heat of fusion the heat absorbing mixture is a mixture of crystals and liquid, but the ratio of crystals to liquid is different.

Figure 3B:
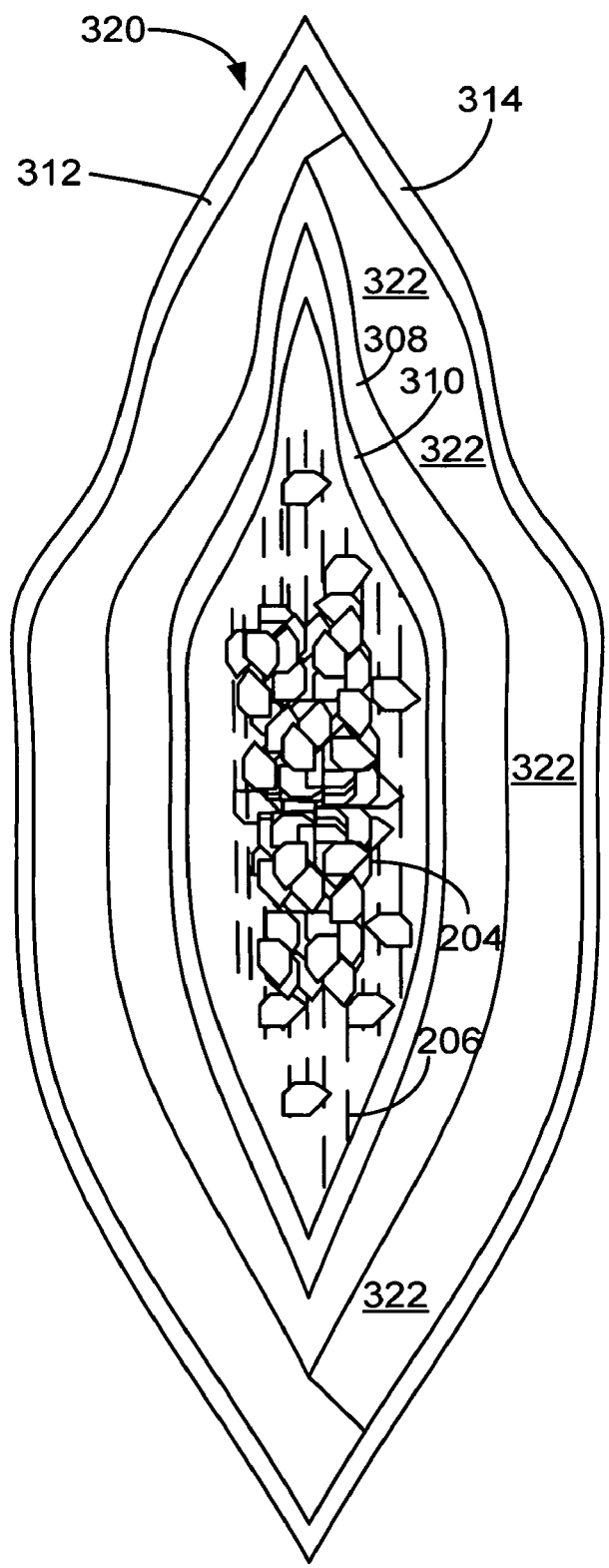
FIG. 3B shows an embodiment of the pack of FIG. 1 including a cushion material FIG. 1.

FIG. 3B shows pack 320. Pack 320 may include crystals 204 and liquid 206, inner layer 308, protective layer 310, outer layer 312, outer layer 314, and cushion layer 322. In other embodiments, pack 320 may not have all of the parts listed and/or may have other parts instead of or in addition to those listed.

Crystals 204 and liquid 206 were discussed above in conjunction with FIG. 2, above. Inner layer 308, protective layer 310, outer layer 312, outer layer 314 were discussed in conjunction with FIG. 3A. Pack 320 may be an embodiment of pack 100. Cushion material 322 is any material that feels cushiony (e.g., that feels soft and/or springy). For example, cushion material 322 may be a soft foam and/or fluffy material used in mattresses, pillows, cushions, ground cloths, and/or blankets. Cushion material 322 is primarily for providing comfort when pack 320 may be placed in an item that a user is expected to lean and/or lie on, such as a mattress, pillow, cushion, ground cloth, and/or blanket. Although cushion layer 322 is a separate layer than outer layer 314 in the embodiment illustrated in FIG. 3B, in other embodiments outer layer 314 may not be present and/or cushion layer 322 and outer layer 314 may be the same layer. Although in the embodiment illustrated in FIG. 3B no cushion material is between outer layer 312 and inner layer 308, a cushion layer may also be placed between inner layer 308 and outer layer 312 or instead of outer layer 312 as long as the cushion material conducts heat well enough so that the user feels a cooling effect as a result of contact with pack 320.

Figure 4:
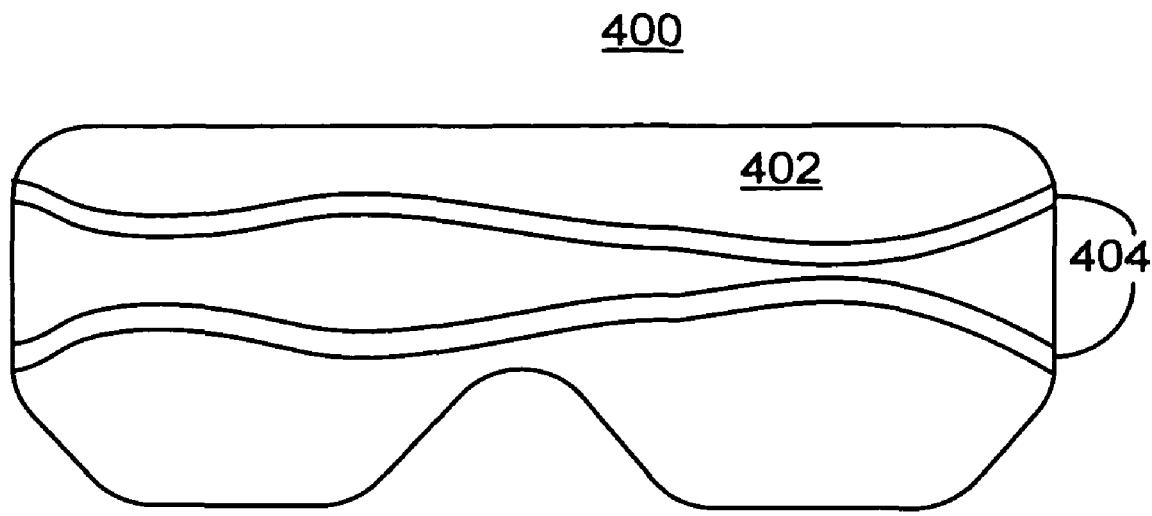
FIG. 4 shows an eye mask that is an embodiment of the pack of FIG. 1.

FIG. 4 shows eye mask 400. Eye mask 400 may include pack 402 and straps 404. In other embodiments, eye mask 400 may not have all of the parts listed and/or may have other parts instead of or in addition to those listed.

Pack 402 is one embodiment of pack 100. Pack 402 has a shape similar to eyeglasses so as to fit comfortably over one's eyes. Cooling one's eyes may aid in relieving stress, relaxing fatigued eyes, relieving some types of head aches, and may help some people fall asleep. Straps 404 hold pack 402 in one place while covering a user's eyes. In one embodiment, straps 404 are made from elastic, and are permanently attached to eye mask 400 in a manner that straps 404 do not open. To wear eye mask 400, straps 404 are stretched around the user's head to hold eye mask 400 in place. However, in another embodiment, straps 404 are made from another material that may not stretch (such as string). Additionally, or alternatively, straps 404 may be detachable at one or both ends and/or may open. For example, straps 404 may open at a portion (of straps 404) that is intended to be placed behind the user's head. Although in the embodiment illustrated in FIG. 4 there are two straps 404, one strap or any number of straps may be used instead. Different embodiments of straps 404 are discussed in connection with FIGS. 7-10. Eye mask 400 may include 0.55 lbs (1.2 Kg) of $Na_2SO_4.H_2O$, which may maintain a constant temperature for substantially 33 minutes (e.g., within 10% of 33 minutes) when used in a room that is at 70° F. and may regenerate in substantially 25 minutes (e.g., within 10% of 25 minutes).

FIG. 5 shows vest 500, which includes pack 502 and pack 504. Pack 502 may include main portion 503a, extension 503b, extension 503c, and straps 506, 508, 510, 512, 514, and 516. Pack 504 may include straps 520 and 522 and edges 524 and 526. In other embodiments, vest 500 may have another shape and may not have all of the parts listed and/or may have other parts instead of or in addition to those listed.

Vest 500 may be worn as clothing, under clothing, or on top of clothing to keep a user cool. A vest, such as vest 500, or another vest including pack 100 may be placed under a bullet proof vest or other vest to keep the wearer cool. Packs 502 and 504 may be embodiments of pack 100.

In an embodiment, both packs 502 and 504 are filled with the heat absorbing mixture. In another embodiment, only one of packs 502 and 504 is filled with the heat absorbing mixture. Main portion 503a covers and may cool the back of a person that is wearing vest 500. Extensions 503b and 503c extend off main portion 503a, and wrap around the sides of the wearer. In an embodiment, each of main portion 503a, extension 503b, and extension 503c are each filled with the heat absorbing mixture. In another embodiment, any one of, any combination of, any combination of sections of main portion 503a, extension 503b, and/or extension 503c may be filled, or not filled, with the heat absorbing mixture. Straps 506 and 508 are attached to an upper and a lower part of extension 503b, respectively, and straps 510 and 512 are attached to an upper and a lower part of extension 503c, respectively. Similarly, straps 514 and 516 are attached to a top part of main portion 503a.

Main portion 505a covers and may cool the front of a person that is wearing vest 500. Extensions 505b and 505c extend off a top part of main portion 505a, and form a v-neck. In an alternative embodiment, the neck area may have a u shape, a rectangular shape, or any other shape. Similar to extensions 503b and 503c, extensions 505d and 505e extend off main portion 505a, and wrap around the sides of the wearer. In an embodiment, each of main portion 505a, extension 505b, extension 505c, extension 505d, and extension 505e are each filled with the heat absorbing mixture. In another embodiment, any one of, any combination of, any combination of sections of main portion 505a, extension 505b, extension 505c, extension 505d, and/or extension 505e may be filled or not filled with the heat absorbing mixture. In the embodiment illustrated in FIG. 5, edges 524 and 526 do not have any straps. In an alternative embodiment, edges 524 and 526 also have straps.

Straps 506, 508, 510, 512, 514, 516, 520, and 522 and edges 524 and 526 may be used for connecting packs 502 and 504 to one another. Specifically, straps 506 and 508 on pack 502 may attach to fastener components located on edge 524 of pack 504. Straps 510 and 512 on pack 502 may attach to fastener components located on edge 526 of pack 504. Optionally, the bottom parts of main portions 503a and 505a connect to one another. Straps 506, 508, 510, 512, 514, 516, 520, and 522 are discussed in conjunction with FIGS. 7-10. Although vest 500 is illustrated as having straps 506, 508, 510, 512, 514, 516, 520, and 522, vest 500 may include any number of straps, as will be discussed below further in conjunction with FIGS. 7-10.

Figure 6:
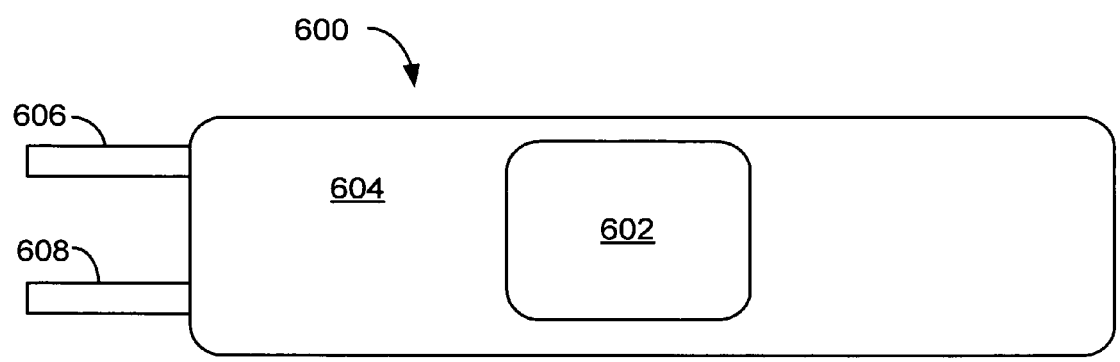
FIG. 6 shows a spot pad that is an embodiment of the pack of FIG. 1.

FIG. 6 shows a spot pad 600. Spot pad 600 may include pack 602, support material 604, and straps 606 and 608. In other embodiments, spot pad 600 may not have all of the parts listed and/or may have other parts instead of or in addition to those listed.

Spot pad 600 may be wrapped around and/or placed on any part of a body to cool a particular spot. Pack 602 may be an embodiment of pack 100, which cools the area to which pack 602 is applied. Support material 604 supports pack 602. Support material 604 wraps around a portion of a body or object and holds pack 602 in place, on the area being cooled. Straps 606 and 608 help keep support material 604 closed and wrapped around the portion of the body having the spot that is being cooled. Straps 606 and 608 are closed after support material 604 is wrapped around a part of a body having a region that is being cooled, and are opened to remove and/or unwrap support material 604 from the part of the body that was being cooled.

Figure 7:
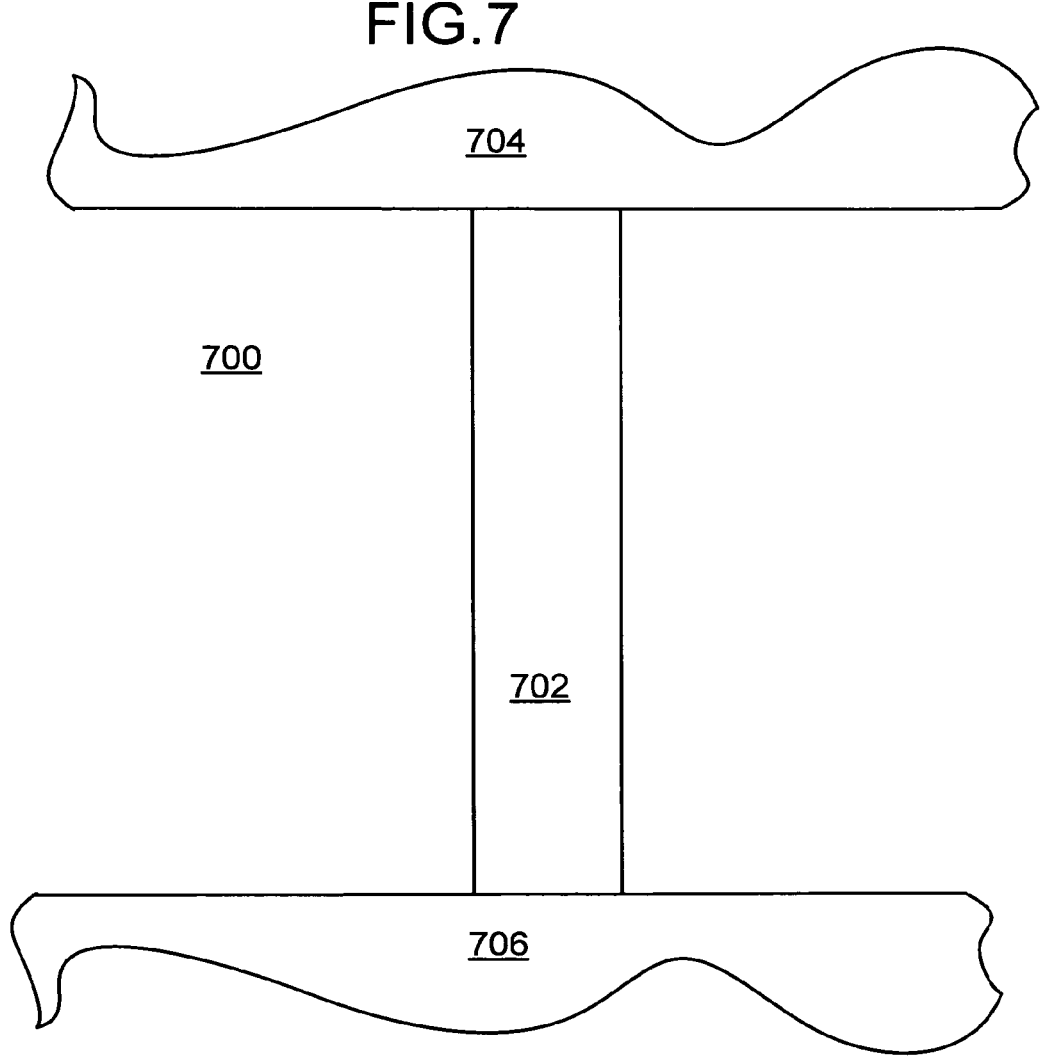
FIG. 7 shows a pack portion having a strap.

FIG. 7 shows pack portions 700 having a strap. Pack portions 700 may include strap 702 attached to sections of material 704 and 706. In other embodiments, pack portions 700 may not have all of the parts listed and/or may have other parts instead of or in addition to those listed.

Pack portions 700 may be a portion of any of the packs in FIGS. 1-6. Strap 702 is a continuous strip of material that does not open or close. Strap 702 may be made from any of a number of different materials, such as elastic, plastic, string, cloth, and/or any other material. Sections of material 704 and 706 are two cutaways of an embodiment of pack 100, which for example may be at opposite ends of pack 100. Sections of material 704 and 706 may be two sections of the same pack or may be two sections from different packs. For example, sections of material 704 and 706 may be the sections of the edges of eye mask 400 at which straps 404 are connected to eye mask 400.

Figure 8:
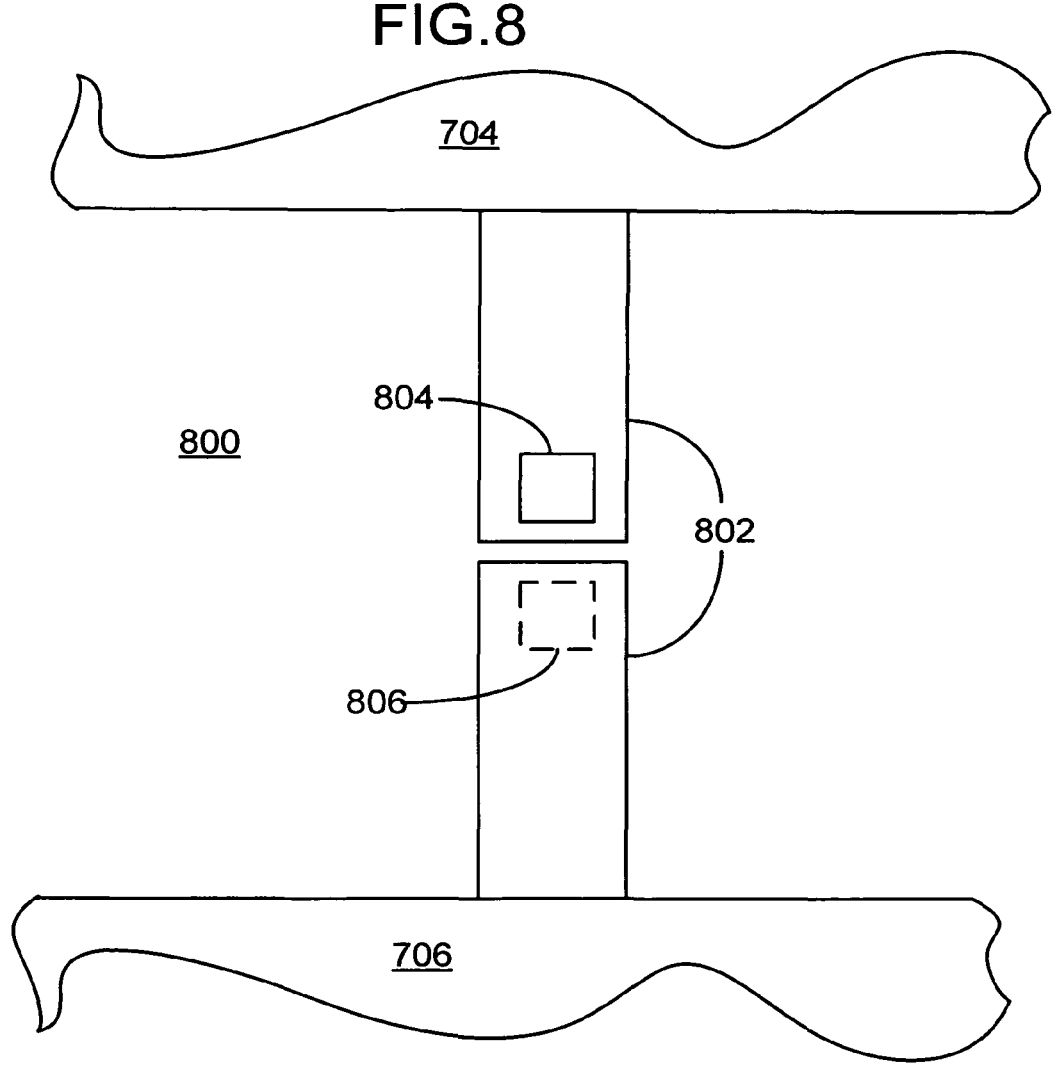
FIG. 8 shows a pack portion having another type of strap.

FIG. 8 shows pack portions 800 having straps. Pack portions 800 may include sections of material 704 and 706, strap 802, and fastener components 804 and 806. In other embodiments, pack portions 800 may not have all of the parts listed and/or may have other parts instead of or in addition to those listed.

Sections of material 704 and 706 were discussed above in connection with FIG. 7, above. Pack portions 800 are similar to pack portions 700, except the strap is somewhat different. Strap 802 is similar to strap 702, and may be made from the same materials as strap 702. However, whereas strap 702 does not open, strap 802 may be opened and closed. Fastener components 804 and 806 are two components of a fastener that fasten together. Fastener component 806 is shown in a dotted line, because fastener component 806 is hidden from view by strap 802. Fastener components 804 and 806 may be an interlocking material (such as that often sold under the name Velcro®). Although fastener components 804 and 806 are shown as rectangular, fastener components may have any shape. As an alternative to using an interlocking material, fastener components 804 and 806 may be a button, snap, zipper, or other fastener.

Figure 9:
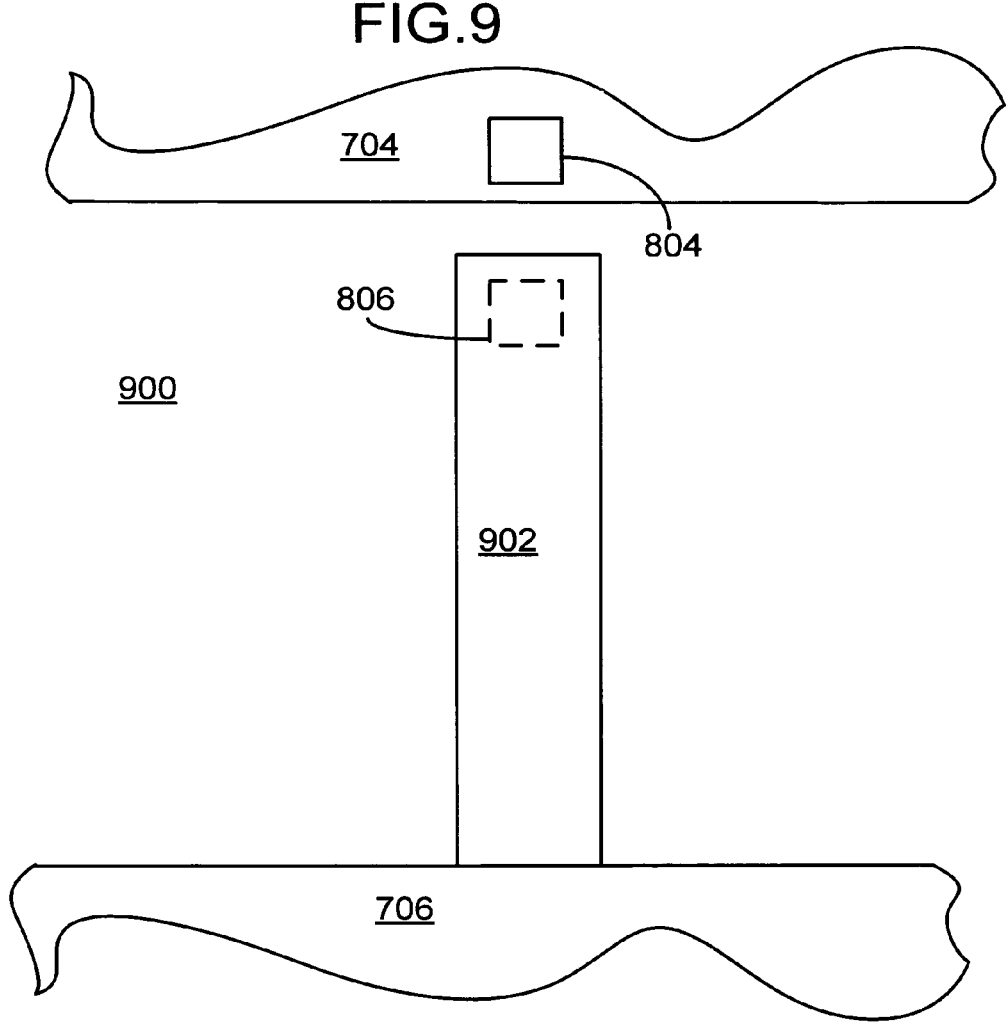
FIG. 9 shows a pack portion having another type of strap.

FIG. 9 shows pack portions 900 having a different type of strap. Pack portions 900 may include sections of material 704 and 706, fastener components 804 and 806 and strap 902. In other embodiments, pack portions 900 may not have all of the parts listed and/or may have other parts instead of or in addition to those listed.

Sections of material 704 and 706 were discussed in conjunction with FIG. 7, and fastener portions 804 and 806 were discussed in conjunction with FIG. 8. Pack portions 900 are similar to pack portions 700 or 800, except the strap is somewhat different. Strap 902 is similar to strap 802, and may be made from the same materials as strap 702. However, whereas strap 802 opens at a location on the strap (e.g., the middle of the strap), strap 902 connects and disconnects to sections of material 704.

Figure 10:
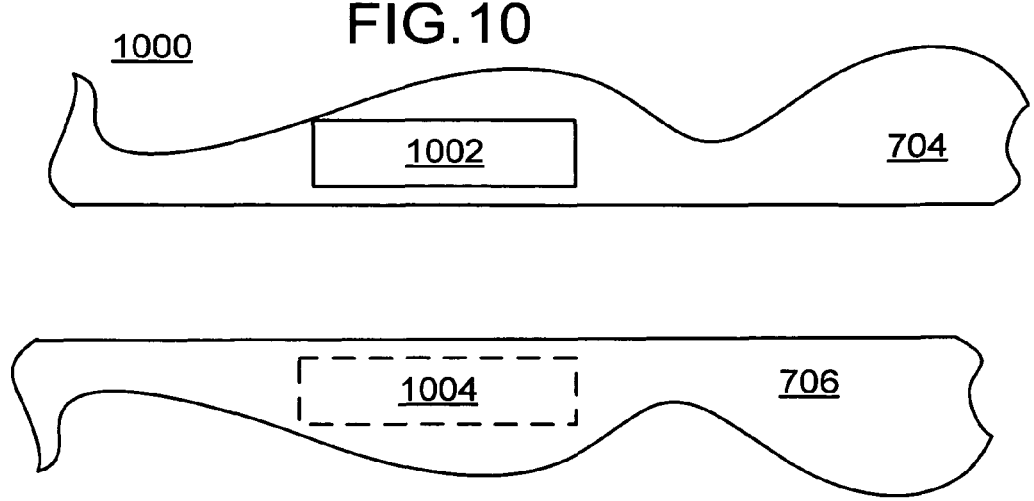
FIG. 10 shows a pack portion that does not have straps.

FIG. 10 shows pack portions 1000, which does not have straps. Pack portions 1000 may include sections of material 704 and 706, fastener components 1002 and 1004. In other embodiments, pack portions 1000 may not have all of the parts listed and/or may have other parts instead of or in addition to those listed.

Sections of material 704 and 706 were discussed in conjunction with FIG. 7. Fastener components 1002 and 1004 are similar to fastener components 804 and 806, except in the embodiments of FIGS. 8 and 10 that are illustrated fastener components 1002 and 1004 have different shapes from fastener components 804 and 806. However, fastener components 1002 and 1004 may each have any shape and/or may have the same shape as fastener components 804 and 806. Pack portions 1000 are similar to pack portions 700, 800, or 900 except that pack portions 1000 does not have any straps. Instead, section of material 704 is fastened directly to section of material 706. Pack portions 700, 800, 900, and 1000 may be substituted one for another. For example, instead of using straps 404 (e.g., instead of using strap 702), eye mask 400 may wrap around the head of a person so that the edges may be fastened one to another without straps (using pack portions 1000).

Figure 11:
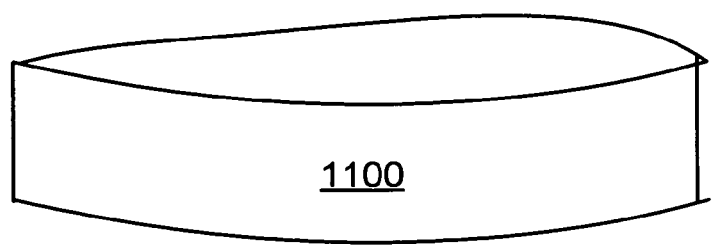
FIG. 11 shows a headband that is an embodiment of the pack of FIG. 1.

FIG. 11 shows a headband 1100, which is an embodiment of pack 100. In other embodiments headband 1100 may have other components. Headband 1100 may be worn around the user's forehead for keeping cool. Headband 1100 may be capable of stretching to fit on the head of a wearer. Headband 1100 may slide onto a person's head and may not be capable of being opened and closed. Alternatively, headband 1100 may open so that it can be wrapped around a person's head and then closed. If headband 1100 opens and closes, headband 1100 may include any number of pack portions, straps, and/or fasteners, such as the pack portions, the straps, and/or the fasteners discussed in conjunction with FIGS. 7-10.

Figure 12:
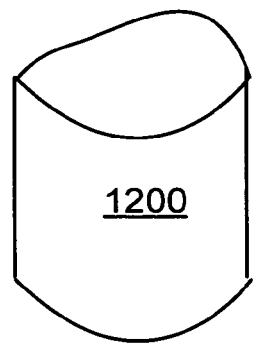
FIG. 12 shows a wrist band that is an embodiment of the pack of FIG. 1.

FIG. 12 shows wrist band 1200, which is an embodiment of pack 100. In other embodiments wrist band 1200 may have other components. Wrist band 1200 may be worn around a user's wrist for keeping cool. Wrist band 1200 may be capable of stretching to fit on the wrist of a wearer. Wrist band 1200 may slide over a user's hand and then onto a user's wrist, and may not be capable of being opened and closed. Alternatively, wrist band 1200 may open so that it can be wrapped around a user's wrist and then closed. If wrist band 1200 opens and closes, wrist band 1200 may include any number of pack portions, straps, and/or fasteners, such as the pack portions, the straps, and/or the fasteners discussed in conjunction with FIGS. 7-10.

Figure 13:
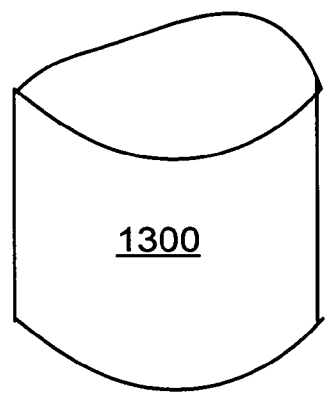
FIG. 13 shows an elbow band that is an embodiment of the pack of FIG. 1.

FIG. 13 shows elbow band 1300, which is an embodiment of pack 100. In other embodiments elbow band 1300 may have other components. Elbow band 1300 may be worn around a user's elbow for keeping cool. Elbow band 1300 may be capable of stretching to fit on the elbow of a wearer. Elbow band 1300 may slide over a user's hand and arm and then onto the user's elbow, and may not be capable of being opened and closed. Alternatively, elbow band 1300 may open so that it can be wrapped around a user's elbow and then closed. If elbow band 1300 opens and closes, elbow band 1300 may include any number of pack portions, straps, and/or fasteners, such as the pack portions, the straps, and/or the fasteners discussed in conjunction with FIGS. 7-10.

Figure 14:
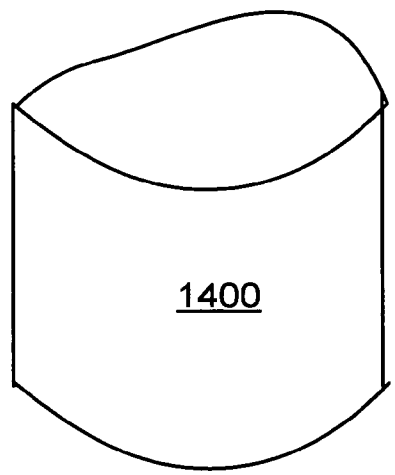
FIG. 14 shows a knee band that is an embodiment of the pack of FIG. 1.

FIG. 14 knee band 1400, which is an embodiment of pack 100. In other embodiments knee band 1400 may have other components. Knee band 1400 may be worn around a user's knee for keeping cool. Knee band 1400 may be capable of stretching to fit on the knee of a wearer. Knee band 1400 may slide over a user's foot and leg and then onto the user's knee, and may not be capable of being opened and closed. Alternatively, Knee band 1400 may open so that it can be wrapped around a user's knee and then closed. If knee band 1400 opens and closes, knee band 1400 may include any number of pack portions, straps, and/or fasteners, such as the pack portions, the straps, and/or the fasteners discussed in conjunction with FIGS. 7-10.

Headband 1100, wrist band 1200, elbow band 1300, and knee band 1400 may be essentially the same, differing primarily (or only) in their dimensions and/or aspect ratios.

Figure 15:
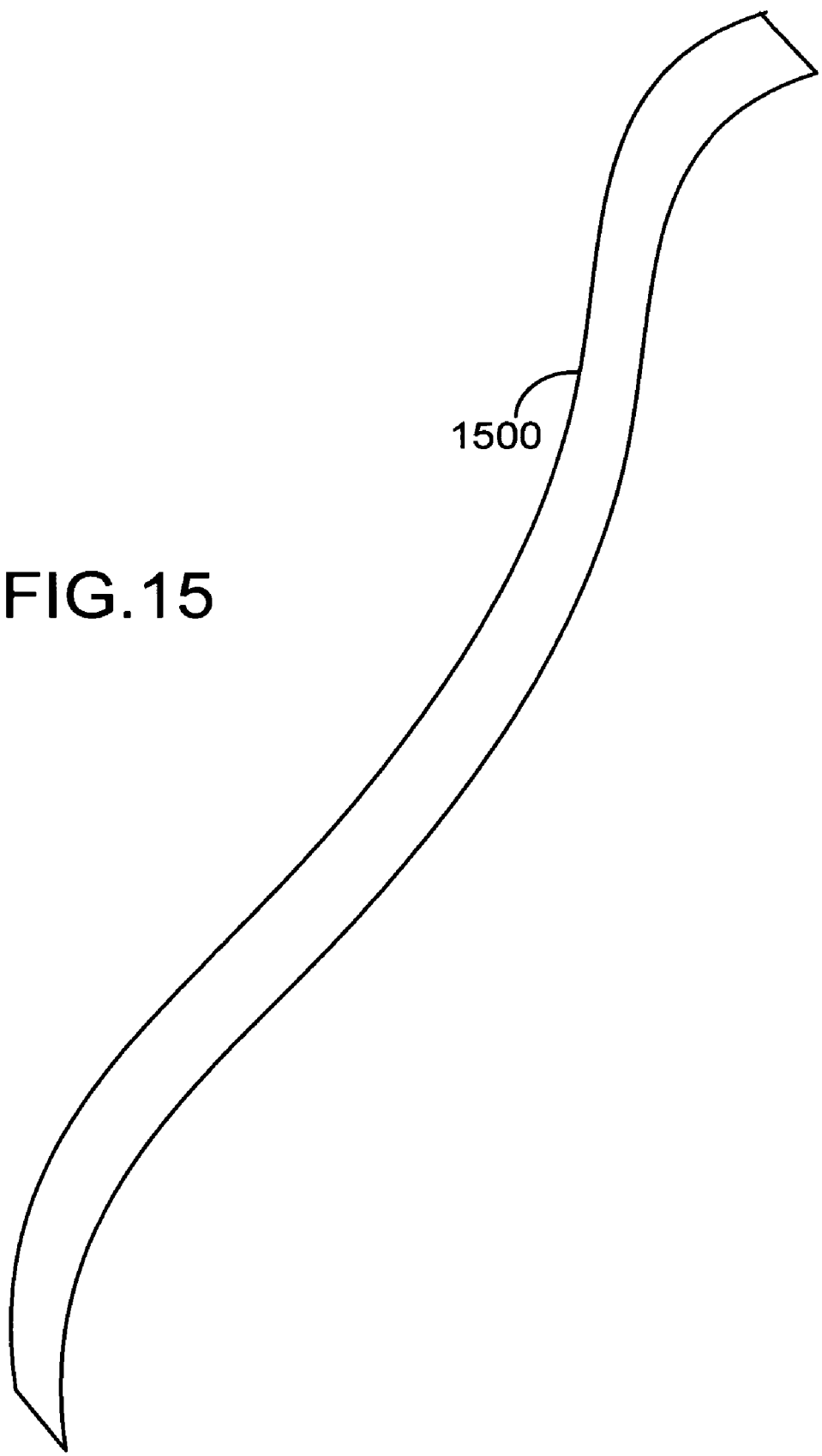
FIG. 15 shows a necktie that is an embodiment of the pack of FIG. 1.

FIG. 15 shows a necktie 1500, which is an embodiment of pack 100. In other embodiments, necktie 1500 may have other components. Necktie 1500 may be wrapped around the neck of a user and tied into a knot or bowtie. Necktie 1500 may be an embodiment of pack 100. In an embodiment, necktie 1500 is completely filed with the heat absorbing mixture. Alternatively, only the portion of necktie that is expected to be wrapped around the neck of the user contains the heat absorbing mixture or any combination of sections of necktie 500 may be filled on not filled with the heat absorbing mixture. Necktie 1500 may facilitate keeping the neck portion and/or other portions of the user's body cool.

Figure 16:
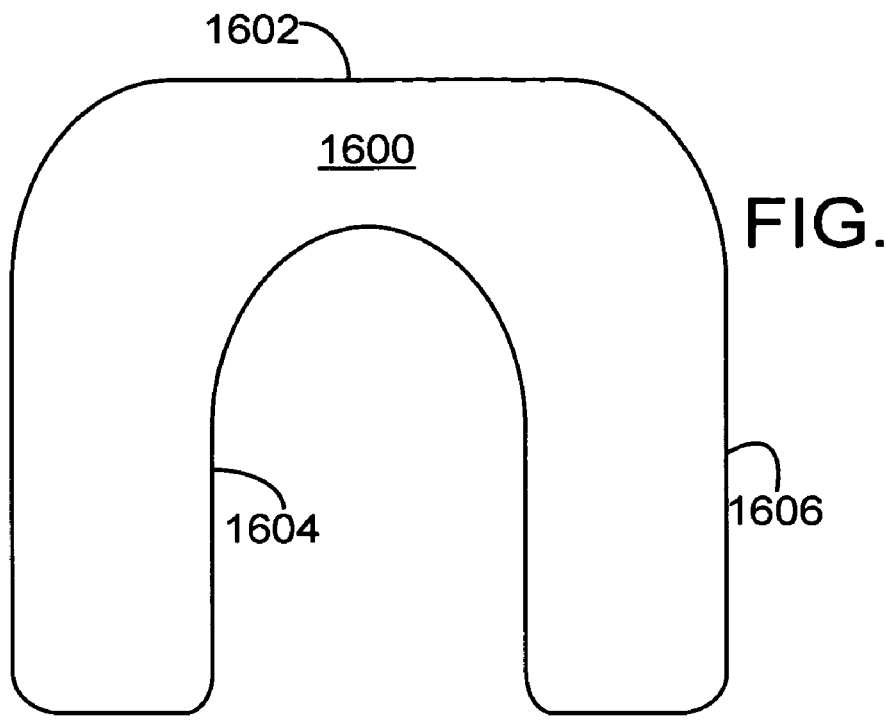
FIG. 16 shows a head support that is an embodiment of the pack FIG. 1.

FIG. 16 shows a wrap 1600, which is an embodiment of pack 100. In other embodiments, wrap 1600 may have other components. Wrap 1600 may include back portion 1602, and side extensions 1604 and 1606. While keeping the user cool, wrap 1600 may wrap around a users neck and/or shoulders to keep the neck and/or shoulders cool, which may be desirable after a work out or on a hot day. Alternatively, wrap 1600 may be used to prop a user's head, keeping the head from falling sideways while sleeping and thereby prevent the sleeping person form being awakened from the head falling. Back portion 1602 may be placed behind the head at the neck area. Side extensions 1604 and 1606 may rest on the shoulders, and extend along the side of the head at the neck area onto the chest area. Wrap 1600 may be used for cooling the back and sides of the neck, the shoulders, and/or part of the chest.

Figure 17:
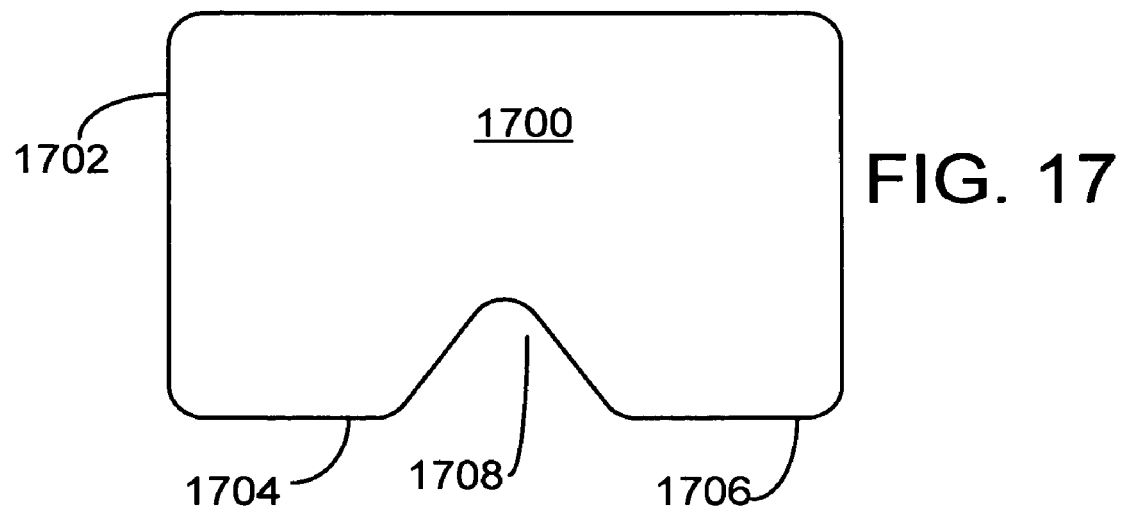
FIG. 17 shows a spot pack that is an embodiment of the pack of FIG. 1.

FIG. 17 shows a spot compress 1700, which is an embodiment of pack 100. Spot compress 1700 may include main portion 1702, and extensions 1704 and 1706, which form v 1708. In other embodiments, spot compress 1700 may not have all of the components listed above and/or may have other components in addition to or instead of those listed above.

Spot compress 1700 may be placed in any of a variety of spots on a body to cool that portion of the body. Main portion 1702 may cool a particular area, while extensions 1704 and 1706 may be placed so as extend around a protrusion, such as a limb, and also cool the regions of the side of the protrusion. As another example, spot compress 1700 may be placed on a shoulder, and extensions 1704 and 1706 may be placed in the front and back of the neck. Any one of, any combination of, any combination of sections of main portion 1702, extension 1704, and/or extension 1704 may be filled, or not filled, with the heat absorbing mixture.

Figure 18:
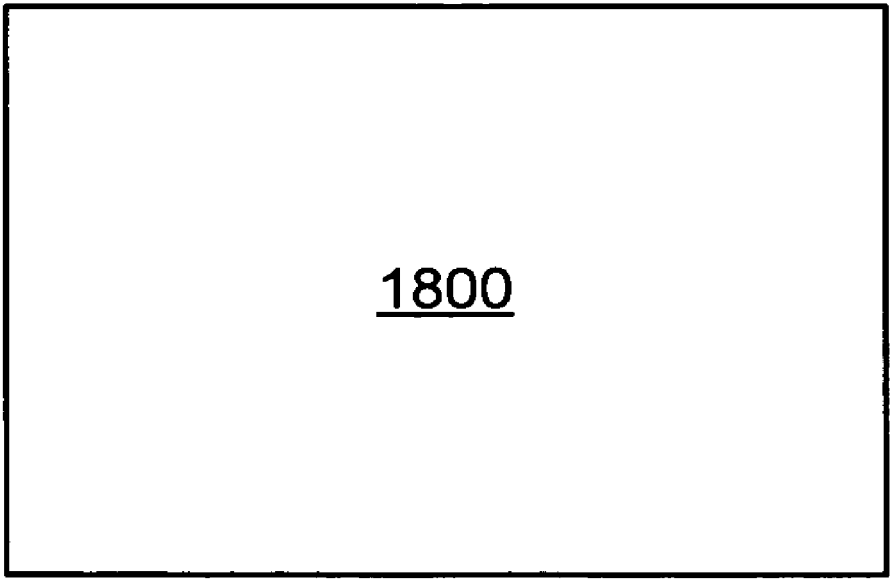
FIG. 18 shows a cushion that may be an embodiment of the pack of FIG. 1.

FIG. 18 shows cushion 1800, which may be an embodiment of pack 100. In other embodiments, cushion 1800 may have other components. Cushion 1800 may be placed in any of a variety of places on a body. Although cushion 1800 are illustrated as a rectangle (e.g., a square), cushion 1800 may be any of a variety of shapes, such as a triangle, circle, a donut shape, a trapezoid, rhombus, diamond, a polygon, or any other shape FIG. 19A shows a sheet 1900, which is an embodiment of a pack 100. Sheet 1900 may have divisions 1902, 1904, 1906, 1908, 1910, 1912, 1914, 1916, 1918, 1920, 1922, and 1924. In other embodiments, sheet 1900 may not have all of the parts listed and/or may have other parts instead of or in addition to those listed.

Sheet 1900 may be a ground cloth or a blanket, for example. A user may lie on, lie under, or wrap oneself within sheet 1900 to keep cool. A user may wrap an item, such as a container of food, within sheet 1900 to facilitate keeping the item. Divisions 1902, 1904, 1906, 1908, 1910, 1912, 1914, 1916, 1918, 1920, 1922, and 1924 keep the heat absorbing mixture distributed throughout the sheet. In general the more divisions, the less likely the heat absorbing material will bunch up in one place.

Figure 19B:
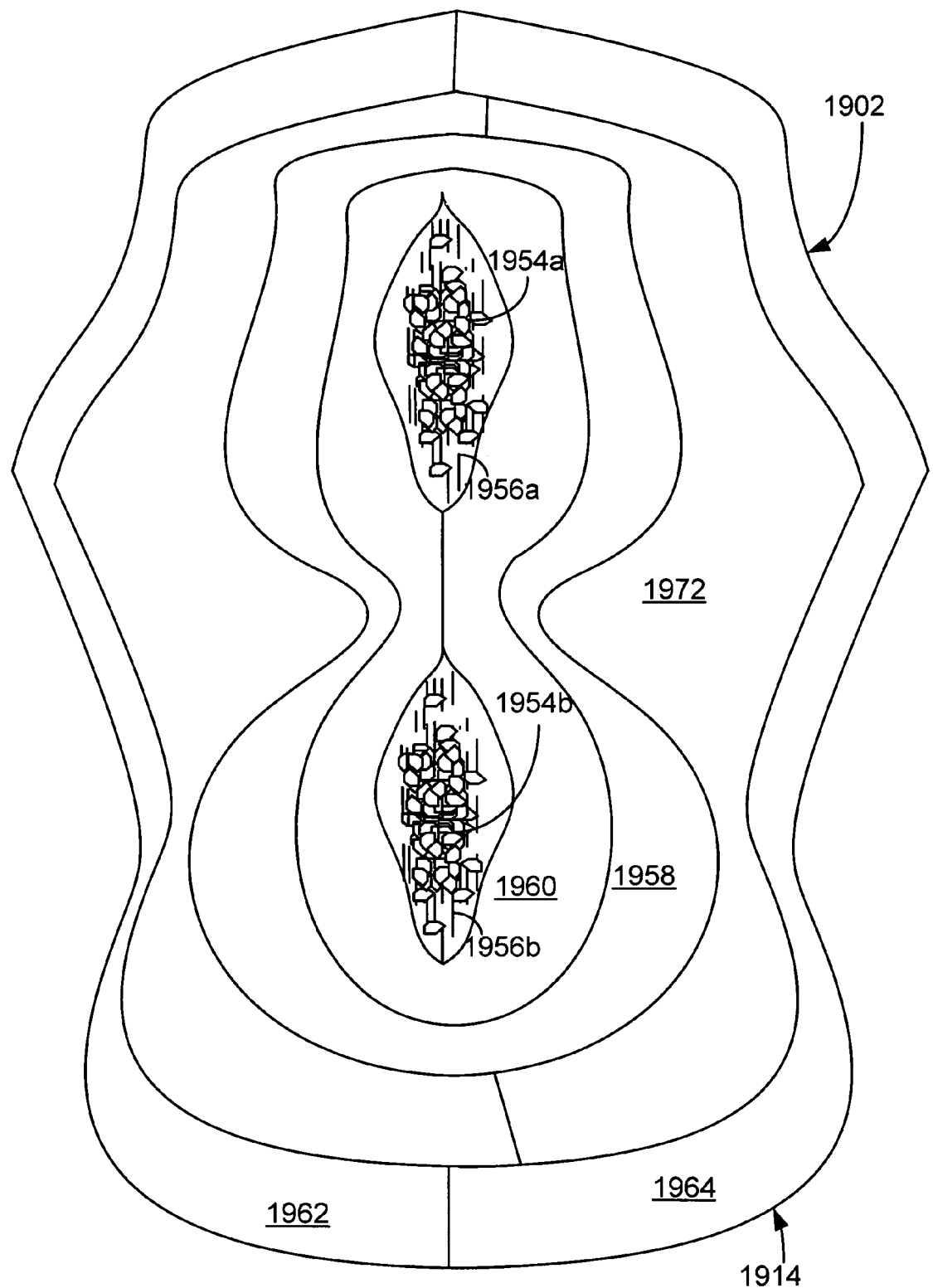
FIG. 19B shows a cross section of the embodiment of the pack of FIG. 19A.

FIG. 19B shows a cross section of division 1902 and 1914. Division 1902 may include crystals 1954a and liquid 1956a. Division 1914 may include crystals 1954b and liquid 1956b. Divisions 1902 and 1914 may include inner layer 1958, protective layer 1960, outer layer 1962, outer layer 1964, and cushion layer 1972. In other embodiments, division 1902 and 1914 may not have all of the parts listed and/or may have other parts instead of or in addition to those listed.

Crystals 1954a and 1954b are the same as crystals 204, and liquid 1956a and 1956b are the same as liquid 206, which were discussed above in conjunction with FIG. 2, above. Inner layer 1958 is the same as inner layer 308, protective layer 1960 is the same as protective layer 310, outer layer 1962 is the same as outer layer 312, and outer layer 1964 is the same as outer layer 314, which were discussed in conjunction with FIG. 3A. Cushion material 1972 is the same as cushion material 322, which was discussed in conjunction with FIG. 3B. However, whereas inner layer 308, protective layer 310, outer layer 312, outer layer 314, and cushion material 322 were illustrated as forming one division, inner layer 1958, protective layer 1960, outer layer 1962, outer layer 314, and cushion material 1972 may be associated with multiple divisions, two of which are illustrated in FIG. 19B. In the embodiment shown in FIG. 19B there is no clear demarcation between the portion of inner layer 1958, protective layer 1960, outer layer 1962, outer layer 314, and cushion material 1972 that are associated with division 1902 and 1914. However, in other embodiments there may be a clear demarcation, such as a one or more well defined seams separating the portions of inner layer 1958, protective layer 1960, outer layer 1962, outer layer 314, and cushion material 1972 that are associated with each division.

Although divisions are not shown in any of the embodiment of FIGS. 1-18, each of the embodiments of FIGS. 1-18 may have any number of divisions. For example, headband 1100, wrist band 1200, elbow band 1300, and knee band 1400 may be essentially the same, differing primarily (or only) in their respective numbers of divisions in addition to or instead of differing in their dimensions and/or aspect ratios. In one embodiment, the embodiment of FIG. 3B is used for the packs of FIGS. 16-19B. However, any of the embodiments of the packs of FIGS. 1-3B may be used for any of the packs of FIGS. 4-6 and 11-19B.

Figure 20:
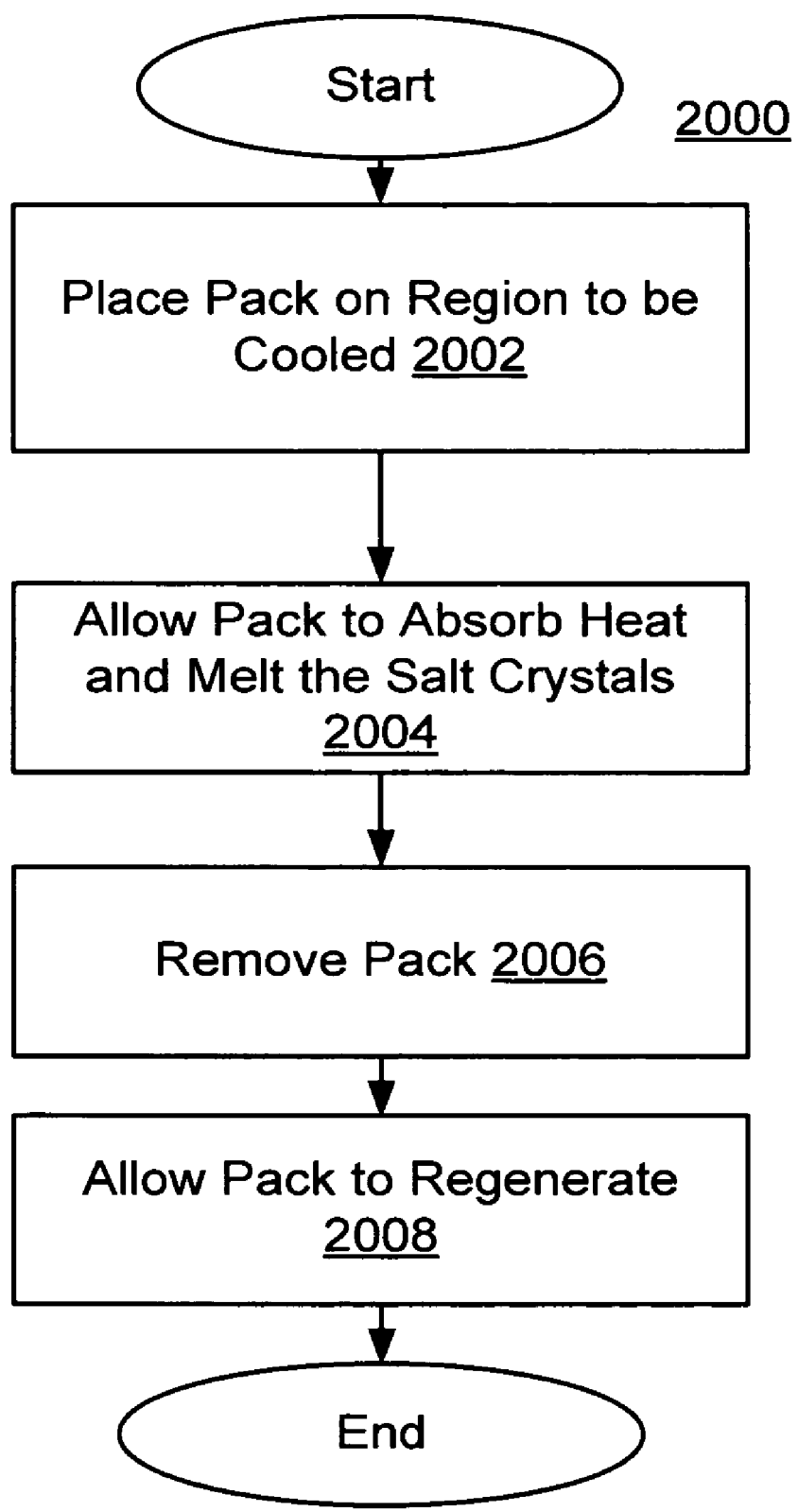
FIG. 20 shows a method for using the pack of FIG. 1.

FIG. 20 shows a method 2000 for using pack 100. In step 2002, pack 100 is placed in contact with a region of a subject that is being cooled. In step 2004, the pack 100 is allowed to absorb heat from the subject being cooled. In step 2006, the pack 100 is removed. Step 2006 may occur when the subject being cooled has decided that pack 100 is no longer necessary, or after pack 100 has absorbed enough heat so that the temperature of pack 100 begins to rise. In step 2008, pack 100 is allowed to regenerate. In step 2008, pack 100 may be allowed to fully regenerate or partially regenerate before performing method 2000 another time.

A set of instructions including at least a part of method 2000 may be recorded on a physical medium (e.g., paper or a machine readable medium such as a CD) and sold together with an embodiment of pack 100. The set of instructions may also include one or more instructions to apply pressure to pack 100 (e.g., by hand) and therein crush (e.g., gently crush) large crystals and/or groups of crystals that have caked or otherwise aggregated together. Alternatively, or additionally, the instruction set may include one or more instructions about not subjecting the heat absorbing material to high temperatures and/or about not placing the heat absorbing material in a washing machine or dryer at high temperatures. The instructions may indicate to wash outer layer 312, outer layer 314, and/or cushion layer 322 (e.g., in a washing machine and or dryer) separately from the rest of the pack. In other embodiments, subsets of the steps listed above are used to form their own method. Method 2000 may have other steps in addition to and/or instead of those listed above.

Figure 21:
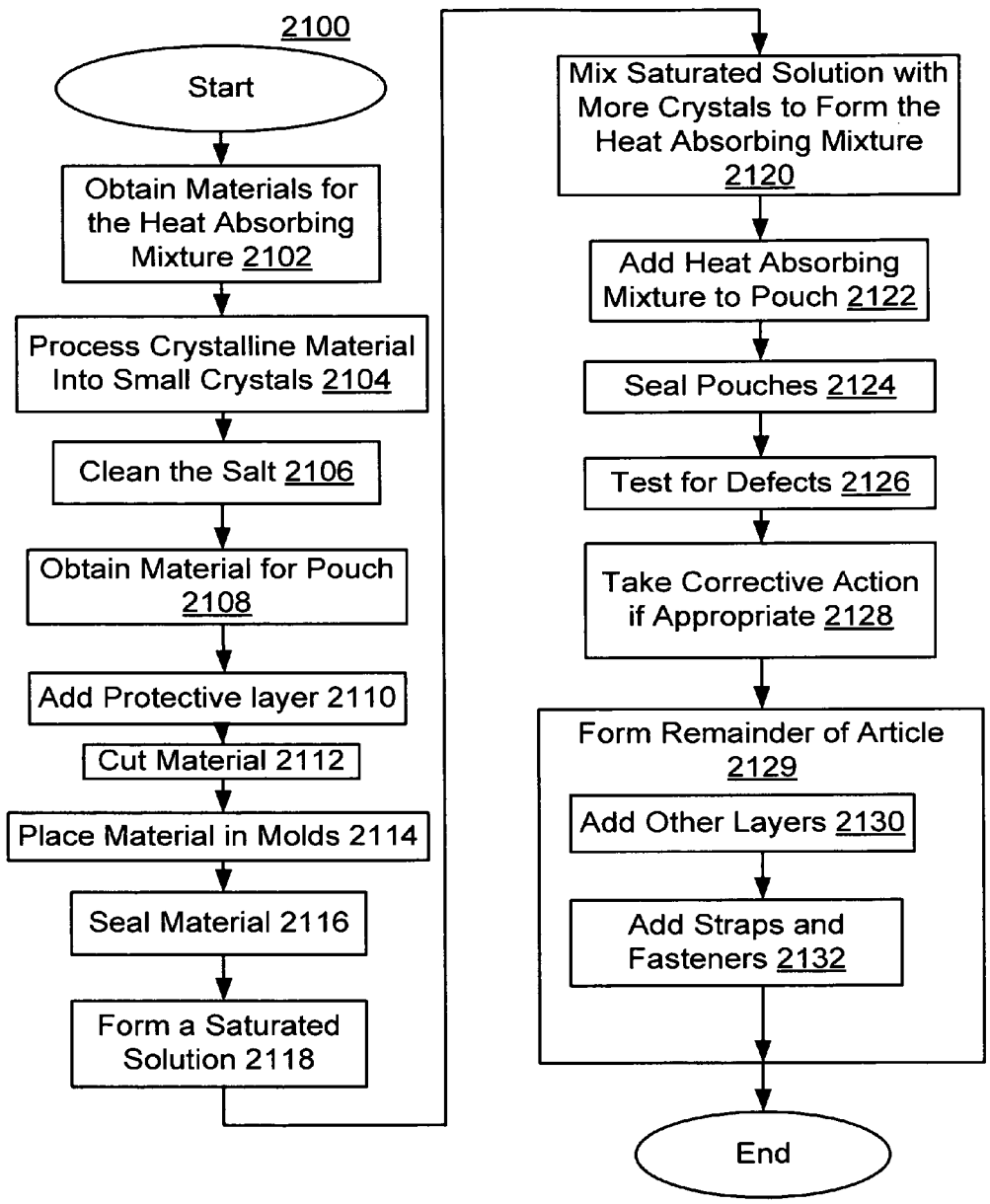
FIG. 21 shows a method for making the pack of FIG. 1.

FIG. 21 shows a method 2100 for making pack 100. In step 2102 the crystals for the heat absorbing mixture, such as sodium sulfate salt crystals, are obtained. For example, sodium sulfate salt may be mined. In step 2104, if necessary the crystals are processed into fine small crystals. In step 2106, if necessary the crystals (e.g., the sodium sulfate salt crystals) are cleaned. In step 2108, the materials for pack 100, such as cotton, satin, nylon vinyl, elastic bands, glue, and/or other materials are obtained. In step 2110, a protective layer, such as a layer of glue or of a sealant, is added to one side of inner layer 308 or one side of what is currently material 102 (e.g., the glue is placed on one side of nylon vinyl). In step 2112, the sheets that may be used to form the completed material 102 or the article formed by the combination of protective layers 308 and protective layer 310 are cut (e.g., the sheets of nylon vinyl, cotton, and satin are cut) to a size that fits a group of molds. In step 2114, the article formed by the combination of protective layers 308 and protective layer 310 are, or what is current material 102 is, (e.g., nylon vinyl is) placed into molds (without necessarily cutting the nylon vinyl into pieces corresponding to the individual molds). Different products have different shaped molds. Each mold may have multiple divisions.

In step 2116, two pieces of the sheet formed by the combination of inner layer 308 and protective layer 310 or what is currently material 102 (e.g., of nylon vinyl having glue on one side) are sealed together and the different divisions are sealed together, thereby forming pouches shaped according to the molds. The sealing may be caused by applying heat to the edges of each division of each pack 100. The seal formed should be sufficient to keep the crystals and liquid of the heat absorbing mixture in a closed loop system in which no contaminants or substantially no contaminants enter and none or substantially none of the heat absorbing mixture leaks out of pack 100. Alternatively, the leakage and contaminants are small enough such that the system is close enough to a closed loop such that regeneration occurs multiple times (e.g., hundreds of times, thousands of times, or until the material 102 degrades and/or wears down). If the heat absorbing material is sodium sulfate and water, each division may have a size appropriate for holding 1.2 Kg of the sodium salt/water crystals, for example. Different products may have different numbers of divisions and divisions of different sizes. In an embodiment, a pillow may have 4 to 8 divisions. Steps 2102-2106 may be performed in any order with respect to steps 2108-2116.

In optional step 2118, liquid 206 (e.g., a saturated solution of salt water) is formed at a temperature at which the salt water mixture is intended to be used for cooling, (e.g., 70° F. for sodium sulfate and water). In step 2120, liquid 206 is mixed with crystals 204 (e.g., the saturated salt water is mixed with more salt) forming the heat absorbing mixture. In step 2122, the heat absorbing mixture formed in steps 2118 and 2120 (e.g., the sodium sulfate salt water mixture) is added to the pouch. In step 2120 the ratio of liquid 206 and crystals 204 (e.g., the ratio of salt to water) is such that enough of crystals 204 remain solid at the melting temperature to provide many nucleation sites. For example, when using sodium sulfate, 70% salt and 30% saturated salt water may be mixed together at 70° F. The mixture of crystals 204 and liquid 206 (e.g., the salt and the saturated water) form a closed loop environment for crystals 204 and liquid 206 that is capable of regenerating into crystals 104 after each use. In an alternative embodiment, the liquid and solid (e.g., the sodium sulfate salt and the water) are mixed in the correct ratio, without first forming liquid 204 (e.g. the saturated sodium sulfate salt solution). In another embodiment, the heat absorbing mixture is formed inside the pouches that make up the divisions formed in step 2116. Steps 2118-2120 may be performed in any order with respect to steps 2108-2116.

In step 2124, the open ends of the pouches and divisions are sealed. In step 2126, each pouch is tested for defects. For example, each nylon vinyl pouch may be tested for leaks. The crystals may be tested to ensure that they regenerate and/or have the correct size. In step 2128, outer layers 312 and 314 are formed. If the product needs a sawn material, the nylon vinyl pouch is placed inside the sawn material and sewn together. In an embodiment, one or more regions where outer layers 312 and/or 314 meet is left a open so that the pouches may be removed and washed separately from outer layers 312 and 314. Outer layers 312 and 314 may be washable in a washing machine on hot or warn water, depending on the materials chosen for outer layers 312 and 314. It may be desirable to wash the pouches containing the heat absorbing material using cold water. Washing the pouches in hot water and placing the pouches in the dryer may cause the heat absorbing mixture in the pouches to supper heat, which may prevent or hamper the heat absorbing mixture from regenerating.

As a specific example of a pack 100 made using method 2100, the nylon vinyl pouch may be covered with satin on one side and ice cotton and/or plush cotton on the other side. There is a balance between softness and cooling. The thicker cotton is softer, but the thinner cotton allows for better cooling. For example, ice cotton may be used for an eye mask, and plush cotton may be used for cushions.

In step 2129, the remainder of the article is formed. Step 2129 may have sub-steps. In sub-step 2130, the pouch is attached to other materials or other materials are attached to the pouch to form the item being made. In optional sub-step 2132, elastic and/or fasteners (such as the interlocking material) is attached (e.g., sewn or bonded) to the product depending on the product. In some embodiment, the interlocking material may adhere better to plush cotton than to ice cotton. Steps 2130 and 2132 may be performed in any order with respect to one another. Some products, such as the cushion, do not have the elastic or the interlocking material, and consequently sub-step 2132 would not be performed for those products. In other embodiments, method 2100 may not have all of the above steps and/or may have other steps in addition to or instead of those listed above. Subsets of the steps listed above as part of method 2100 may be used to form their own method.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
a mixture of a crystalline substance and a liquid, wherein
the mixture has a first phase at a first temperature in which the mixture is solid and a second phase at a second temperature in which the mixture is partially solid and partially liquid,
the second temperature is higher than the first temperature, and
the mixture is capable of absorbing heat while melting and maintaining the second temperature, the mixture is not capable of being fully liquid at the second temperature; and
a pouch containing the mixture, wherein the mixture fully solidifies at 70° F. over a first period of time that is shorter than a second period of time over which the mixture melted.

2. A system comprising:
a mixture of a crystalline substance and a liquid, wherein
the mixture has a first phase at a first temperature in which the mixture is solid and a second phase at a second temperature in which the mixture is partially solid and partially liquid,
the second temperature is higher than the first temperature, and the mixture is capable of absorbing heat while melting and maintaining the second temperature, the mixture is not capable of being fully liquid at the second temperature, wherein the mixture consists substantially of water and sodium sulfate, wherein 65% to 75% by weight of the mixture is sodium sulfate; and a pouch containing the mixture.

3. The system of claim 2, wherein the crystalline substance includes at least one type of salt.

4. The system of claim 2, wherein the crystalline substance is sodium sulfate.

5. The system of claim 2, wherein the liquid includes at least water.

6. The system of claim 2, wherein
the liquid includes at least water, and
the crystalline substance includes at least sodium sulfate.

7. The system of claim 6, wherein the mixture is $Na_2SO_4 \cdot H_2O$.

8. The system of claim 2, further comprising a material that covers at least an outside portion of the pouch.

9. The system of claim 8, wherein the mixture has a melting temperature of less than or equal to 78.6° F. at which the mixture is stable in the second phase.

10. The system of claim 8, wherein the material is one that is expected to conduct heat well enough so that the mixture cools an area placed in contact with the pouch by at least melting the mixture.

11. The system of claim 8, wherein the material is plush cotton.

12. The system of claim 8, wherein the material is ice cotton.

13. The system of claim 8, wherein the material is satin.

14. The system of claim 8, wherein further comprising a first material that covers at least a first outside portion of the pouch on one side and a second material that covers at least a second outside portion on a second side.

15. The system of claim 14, wherein the first material is satin and the second material is cotton.

16. The system of claim 2, wherein the mixture is 70% by weight sodium sulfate and 30% by weight water.

17. The system of claim 2, wherein
the liquid includes at least water;
the crystalline substance includes at least sodium sulfate;
the mixture is substantially 70% by weight sodium sulfate and substantially 30% by weight water;
the pouch includes at least
a material including at least nylon vinyl that forms walls of the pouch, and
a sealant including at least a polyvinyl chloride glue that lines the material inside the pouch; and
the system further includes at least
a covering of cotton that covers at least a first outside portion of the pouch on one side, and
a covering of satin that covers at least a second outside portion on a second side.

18. The system of claim 2, wherein the mixture fully solidifies at 70° F. over a first period of time that is shorter than a second period of time over which the mixture melted, and the mixture is a mixture of $Na_2SO_4$ and $H_2O$.

19. The system of claim 2, wherein the pouch comprises:
a material forming walls of the pouch, and
a sealant lining the material inside the pouch.

20. The system of claim 19, the mixture is only water and $Na_2SO_4$.

21. The system of claim 2, the pouch only contains the mixture.

22. The system of claim 2, the mixture is only water and $Na_2SO_4$.

23. The system of claim 2, the mixture includes at least 25% to 35% by weight water.

24. A method comprising:
forming a mixture of a crystalline substance and a liquid, the mixture is 65% to 75% by weight sodium sulfate and 25% to 35% by weight water, wherein
the mixture has a first phase at a first temperature in which the mixture is solid and a second phase at a second temperature in which the mixture is partially solid and partially liquid,
the second temperature is higher than the first temperature, and
the mixture is capable of absorbing heat while melting and maintaining the second temperature; and
forming a pouch containing the mixture.

25. A method comprising:
placing a pack containing at least mixture of a crystalline substance and a liquid on a portion of a subject, the mixture is 65% to 75% by weight sodium sulfate and 25% to 35% by weight water, wherein
the mixture has a first phase at a first temperature in which the mixture is solid and a second phase at a second temperature in which the mixture is partially solid and partially liquid,
the second temperature is higher than the first temperature, and
the mixture is capable of absorbing heat while melting and maintaining the second temperature; and
allowing the mixture to absorb heat from the portion of the subject, therein cooling the portion.

26. A system comprising:
a mixture of a crystalline substance and a liquid, wherein
the mixture has a first phase at a first temperature in which the mixture is solid and a second phase at a second temperature in which the mixture is partially solid and partially liquid,
the second temperature is higher than the first temperature, and
the mixture is capable of absorbing heat while melting and maintaining the second temperature, the mixture is not capable of being fully liquid at the second temperature, wherein the mixture consists substantially of water and sodium sulfate, wherein 65% to 75% by weight of the mixture is sodium sulfate; and
a pouch containing the mixture wherein the pouch comprises:
a material forming walls of the pouch, and
a sealant lining the material inside the pouch.

27. The system of claim 26, wherein the material is nylon vinyl.

28. The system of claim 26, wherein the sealant is a polyvinyl chloride glue.

* * * * *